United States Patent [19]
Sakano et al.

[11] Patent Number: 5,239,157

[45] Date of Patent: Aug. 24, 1993

[54] SUPERCONDUCTING ACCELERATING TUBE AND A METHOD FOR MANUFACTURING THE SAME

[75] Inventors: Misao Sakano; Shinichi Mukoyama; Takashi Shimano, all of Yokohama, Japan

[73] Assignee: The Furukawa Electric Co., Ltd., Tokyo, Japan

[21] Appl. No.: 746,122

[22] Filed: Aug. 15, 1991

[30] Foreign Application Priority Data

Oct. 31, 1990 [JP] Japan .................................. 2-293949
Apr. 19, 1991 [JP] Japan .................................. 3-88355

[51] Int. Cl.$^5$ ........................ B23K 26/12; H05H 7/20
[52] U.S. Cl. ................................ 219/121.64; 29/599; 315/3.5; 315/5.41
[58] Field of Search ........................ 219/121.64, 121.63, 219/57, 58, 59.1, 101, 104, 107; 505/866, 925, 926, 927; 29/599; 315/3.5, 5.41; 333/99 R, 995, 157

[56] References Cited

U.S. PATENT DOCUMENTS

| 3,514,662 | 5/1970 | Eldredge | 29/599 |
| 3,895,432 | 7/1975 | Diepers et al. | 505/927 |
| 3,949,186 | 4/1976 | Makayama et al. | 219/121.64 |
| 4,414,460 | 11/1983 | Sudo et al. | 219/121.64 |
| 4,760,236 | 7/1988 | Stoll | 219/121.63 |
| 4,913,337 | 4/1990 | Gotoh | 228/173.6 |
| 4,948,939 | 8/1990 | Moon | 219/121.64 |
| 5,095,188 | 3/1992 | Klein | 219/121.64 |

FOREIGN PATENT DOCUMENTS

| 0115578 | 8/1984 | European Pat. Off. |  |
| 1-183177 | 7/1989 | Japan | 29/599 |
| 2-165600 | 6/1990 | Japan |  |
| 3-135000 | 6/1991 | Japan |  |
| 3-147299 | 6/1991 | Japan |  |

OTHER PUBLICATIONS

Patent Abstracts of Japan, vol. 15, No. 348, Sep. 1991, & JP-A-03 135 000.
Patent Abstracts of Japan, vol. 14, No. 205, Apr. 1990, & JP-A-044 661.
Patent Abstracts of Japan, vol. 15, No. 371, Sep. 1991, & JP-A-03 147 299.
IEEE Transactions on Nuclear Science, vol. 30, No. 4, Aug. 1983, pp. 3354–3356, Superconducting Cavities from Niobium-Copper Material, H. Padamsee.

*Primary Examiner*—Geoffrey S. Evans
*Attorney, Agent, or Firm*—Frishauf, Holtz, Goodman & Woodward

[57] ABSTRACT

A superconducting accelerating tube which is constructed in a manner such that a plurality of components, formed of a superconducting material and individually having peripheral end portions adapted to be butted to one another, are butted to one another at the peripheral end portions, and the butting portions butted to one another are welded together. In the superconducting accelerating tube according to the present invention, the butting portions are welded by means of a laser beam, and the laser beam is applied to the butting portions so that the components are laser-welded to one another. Preferably, the accelerating tube is designed so that at least only the respective inner surfaces of the butting portions are laser-welded, and the depth of welding is not greater than half the thickness of the superconducting material and not smaller than 150 μm.

15 Claims, 15 Drawing Sheets

SUPERCONDUCTING ACCELERATING TUBE AND A METHOD FOR MANUFACTURING THE SAME

BACKGROUND OF THE INVENTION

1. Field of the Invention

The present invention relates to a superconducting high-frequency accelerating tube formed of Nb or the like and used in a charged particle accelerator for accelerating charged particles, and a method for manufacturing the same.

2. Description of the Related Art

Accelerators are based on the principle that charged particles can be accelerated by adjusting the phase velocity of a progressive wave, which has an electric field component in the traveling direction of the charged particles, so that the charged particles are always on the phase of acceleration and are affected by an accelerating electric field. Among these accelerators, ones which utilize a high-frequency electric field use an accelerating tube as means for generating the high-frequency electric field.

A superconducting accelerating tube, made of a superconductor, is used to form a higher-intensity accelerating electric field by means of lower electric power, and niobium (Nb) or the like is used as the material. Since a current excited by means of the high-frequency electric field flows in the vicinity of the inner surface of the accelerating tube, moreover, it is essential to improve the electrical properties of the accelerating tube so that charged particles can flow smoothly, without running out of the tube in the region near the peripheral end portions of inner surfaces at which components of the tube are joined together. Since the superconductivity of the superconductor, such as Nb, is lowered by oxidation, further more, the superconductor should be worked without undergoing oxidation.

In a conventional method for manufacturing superconducting accelerating tubes, a plurality of kinds of components are manufactured by cutting a press-molding a superconducting material, e.g., Nb, and these components are butted to one another at their respective peripheral end portions. Then, the butting portions are welded together to form the accelerating tube having a cell or cells. Among these accelerating tubes, ones which have one cell are called single-cell accelerating tubes, while ones which have a plurality of cells are called multi-cell accelerating tubes.

The TIG (tungsten inert gas) welding process, electron beam welding process, etc. are used to weld those accelerating tubes. Presently, the electron beam welding process is prevailing over other processes, since it facilitates manufacture of accelerating tubes with satisfactory electrical properties.

Using the electron beam welding process for welding the components, however, the conventional method for manufacturing accelerating tubes is subject to the following drawbacks.

In the electron beam welding operation, a plurality of components are butted to one another in a vacuum vessel when they are welded together. In order to cause an electron beam to make a straight advance without scattering, and to prevent Nb or other superconductor from being oxidized, the welding must be executed in a vacuum of $10^{-6}$ torr or less.

Prior to the welding operation, moreover, the components constituting each accelerating tube are assembled into the shape of the accelerating tube in the vacuum vessel, and both ends of the accelerating tube are held by jigs, in order to maintain the shape of the tube, so that the accelerating tube is closed. In welding the components, therefore, the degree of vacuum must be kept uniform in- and outside the accelerating tube, in the vacuum vessel. Conventionally, to cope with this, the jig means is provided with a passage hole or the like, whereby the conductance in- and outside the accelerating tube is increased.

Thus, evacuating the vacuum vessel is so time-consuming that preliminary processes for the welding operation take a lot of time, or equipment, including the vacuum vessel and jigs, is large-scaled, and the jigs is expensive. In consequence, the method using the electron beam welding process entails increased manufacturing cost of the superconducting accelerating tube, and requires highly complicated welding operation.

SUMMARY OF THE INVENTION

An object of the present invention is to provide a superconducting accelerating tube and a method for manufacturing the same, ensuring properties of the accelerating tube equivalent to or higher than those of one manufactured by using the electron beam welding process.

Another object of the invention is to provide a superconducting accelerating tube and a method for manufacturing the same, ensuring low-cost manufacture requiring a short manufacturing time and simple jigs, along with simple welding operation.

In order to achieve the above objects of the present invention, there is provided a superconducting accelerating tube which is constructed in a manner such that a plurality of components, formed of a superconducting material and individually having peripheral end portions adapted to be butted to one another, are butted to one another at the peripheral end portions, and the butting portions butted to one another are welded together. In this accelerating tube, the butting portions are welded by means of a laser beam.

Also, there is provided a method for manufacturing a superconducting accelerating tube which is constructed in a manner such that a plurality of components, formed of a superconducting material and individually having peripheral end portions adapted to be butted to one another, are butted to one another at the peripheral end portions, and the butting portions butted to one another are bonded together by welding. In this method, a laser beam is applied to the butting portions so that the components are laser-welded to one another.

Preferably, the superconducting accelerating tube of the present invention is designed so that at least only the respective inner surfaces of the butting portions are laser-welded, and the depth of welding is not greater than half the thickness of the superconducting material and not smaller than 150 μm. In a case of where the butting portions are welded from inside the accelerating tube, laser-welding only the inner surfaces of the butting portions means fusion of only the surface portion of the manufactured accelerating tube. In a case of where the butting portions are welded form outside, then the fusion will reach the inner surface of the resulting accelerating tube, thus providing smooth weld beads without undulation on the inner surface.

If the depth of welding is greater than half the thickness o the superconducting material, the dimensional accuracy of the manufactured superconducting accelerating tube is lowered by a contraction of the weld portion. The depth of welding is adjusted to 150 $\mu$m or more in consideration of an allowance for polishing a surface of the weld portion to a depth of about 50 to 100 $\mu$m in a succeeding polishing process.

If the thickness of the superconducting material is smaller than 0.1 mm, the strength of the resulting superconducting accelerating tube is too low, and the wall of the tube is too thin for satisfactory laser welding. If the thickness of the superconducting material is greater than 1 mm, on the other hand, the thermal conductivity is low, and inevitably, therefore, the cooling efficiency obtained during the use of the superconducting accelerating tube is low.

In the method for manufacturing the superconducting accelerating tube according to the present invention, if the laser beam is applied to the butting portions of the components butted to one another so that the inner surfaces are laser-welded, the surface of the accelerating tube can be smoothly welded to a depth of about 150 to 300 $\mu$m. Thus, there may be obtained a high-accuracy accelerating tube which has good electrical properties (high quality factor) and is subject to less welding-induced strain.

If the welding operation is performed in an inert gas atmosphere, moreover, it is unnecessary to create a high vacuum, which is essential to the electron beam welding, and heat produced in the weld portion can be efficiently removed to the outside by being absorbed by the inert gas. Thus, it is particularly advisable to use the inert gas atmosphere in welding a thin-walled accelerating tube. As long as oxidation of the superconducting material can be prevented, however, a mere vacuum may be used instead.

If the whole butting portions of the components are welded together after a plurality of spots of the butting portions are tacked to one another by spot welding, the components can be properly positioned with respect to one another, and the resulting superconducting accelerating tube can enjoy a high dimensional accuracy.

By fixing the outer periphery of the accelerating tube by jigs before the welding operation, moreover, the superconducting accelerating tube to be welded can be protected against vibration or some other external force and prevented from being distorted.

Before welding the whole butting portions, furthermore, the region to be welded may be divided into two or more sections, and a predetermined cooling time may be interposed between the end of a welding cycle for one section and the start of one for the next section. By doing this, the weld portion can be rapidly cooled by the difference in temperature from its ambience, so that the superconducting material can be prevented from being excessively oxidized.

If an excessive temperature rise is avoided, and if the period of time during which the weld portion is at high temperature is shortened by the rapid cooling, moreover, the weld portion can be prevented from sagging or melting off, so that the inner surface of the resulting superconducting accelerating tube can be finished smooth.

According to the present invention, there may be provided a superconducting accelerating tube which has properties higher than in the case of the electron beam welding in the vacuum of $10^{-6}$ torr. In the present invention, moreover, a plurality of components are welded by means of a laser beam, so that the superconducting accelerating tube can be manufactured in a short time and with high accuracy, by using simple jigs, and also, the welding operation is simple. Thus, the manufacturing cost can be lowered.

The above and other objects, features, and advantages of the invention will be more apparent from the ensuring detailed description taken in connection with the accompanying drawings.

DETAILED DESCRIPTION

EXAMPLE 1

Referring now the drawings of FIGS. 1 to 9, a superconducting accelerating tube and a manufacturing method therefor according to a first embodiment of the present invention will be described in detail.

Figure 2:
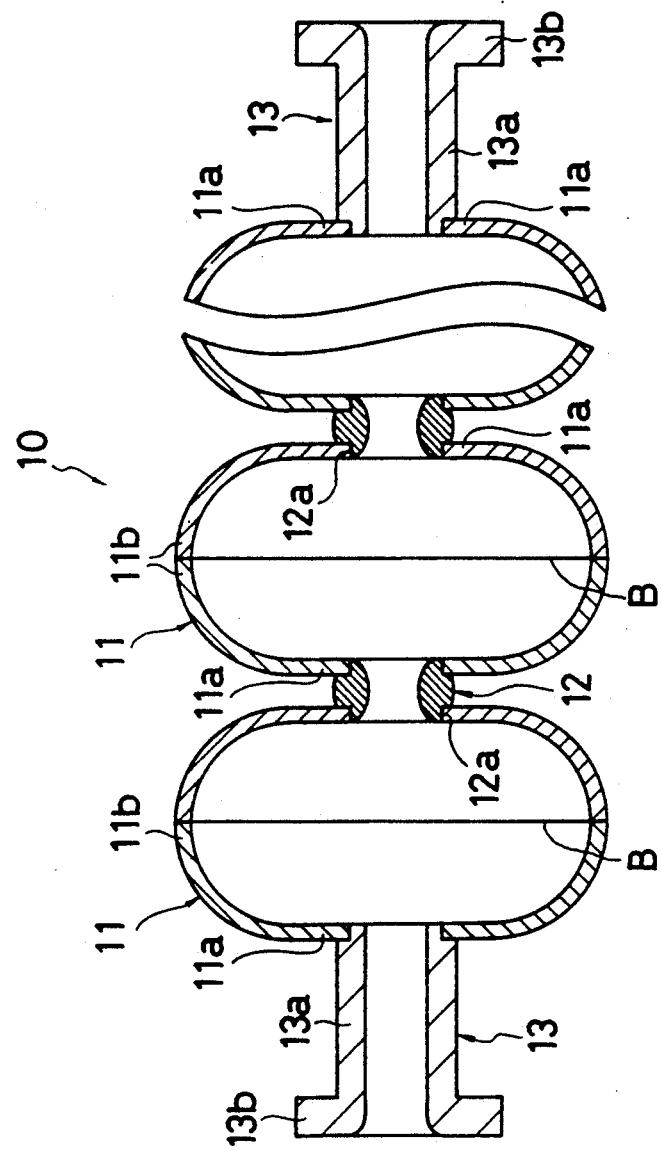
FIG. 2 is a front sectional view showing an example of the accelerating tube of the invention.

A superconducting accelerating tube 10, e.g., a multi-cell accelerating tube shown in FIG. 2, is made of Nb, and is obtained by butting the peripheral end portions of half cells 11, connecting members 12, and flanges 13, and laser-welding the respective surfaces of the butting portions to form a tubular structure.

Each half cell 11 is a dish-shaped member open at its two peripheral end portions and having a wall thickness of 0.5 mm and outside diameter of 9 cm. A small-diameter portion 11a is formed at the one peripheral end portion of the cell 11, while a large-diameter portion 11b is formed at the other peripheral end portion.

Each connecting member 12 is a ring-shaped member which connects each two adjacent half cells 11 at their respective small-diameter portions 11a. A step portion 12a to engage the end of each corresponding small-diameter portion 11a is formed on each peripheral end portion of the connecting member 12. Here the butting portions are the respective surfaces of the large-diameter portions 11b of the half cells 11 butted to one another (same for the following embodiments).

Each flange 13 is a member located at each corresponding end of the superconducting accelerating tube 10, and includes a pipe portion 13a and a flange portion 13b radially extending from an end of the pipe portion 13a. One of the half cells 11 is welded to the pipe portions 13a in a manner such that the small-diameter portion 11a of the cell 11 is butted to the peripheral end portion of the pipe portion 13a.

According to the present invention, the superconducting accelerating tube 10, having the construction described above, is manufactured using the components 11 to 13 in the following manner.

Figure 3:
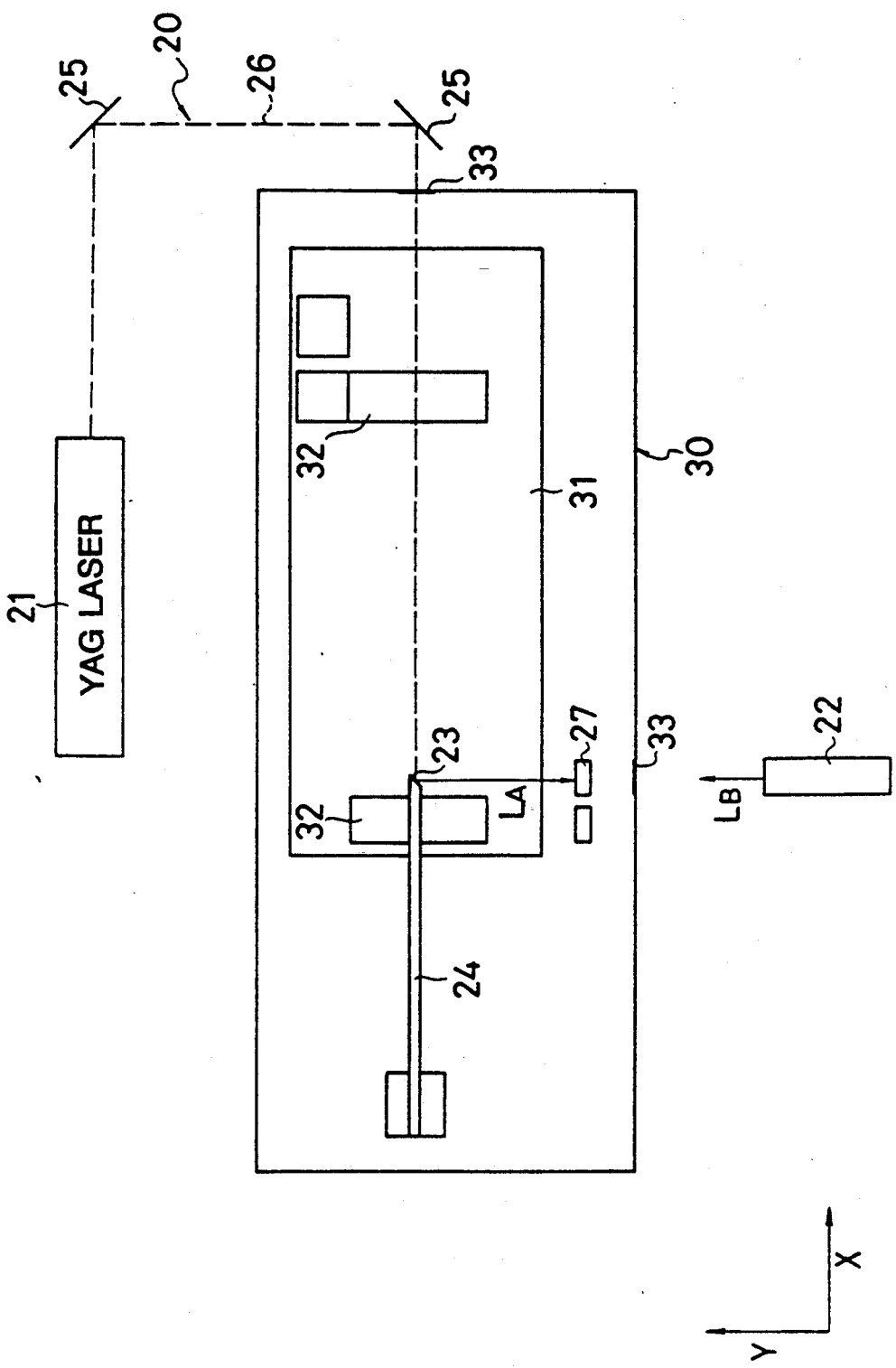
FIG. 3 shows a plan layout diagram showing the optical system and the chamber shown in FIG. 1.

First, an optical system 20 and a chamber 30 for laser-welding the superconducting accelerating tube 10 were arranged in the manner shown in the plan view of FIG. 3. In FIG. 3, numeral 21 designates a YAG laser generator; 22, a probe light source (visible laser source of He-Ne) for positioning welds; 23, a condenser mirror (focal length f=4.5 cm) for condensing a YAG laser beam; 24, a pipe through which an inert gas for cooling the mirror 23 is introduce; and 25, a reflector for defining an optical path 26 of the laser beam. Further, numeral 31 designates a moving table which is movable in the horizontal directions indicated by arrows X and Y in the chamber 30, and carries the accelerating tube 10 thereon for welding operation; 32, rotating devices mounted on the moving table 31; and 33, a window for the laser beam attached to the chamber 30 which is loaded with the inert gas.

As shown in FIG. 3, the optical system 20 was arranged so that an optical axis $L_A$ of the YAG laser beam, emitted from the YAG laser generator 21 and refracted by means of the condenser mirror 23 to reach the probe light source 22, was in alignment with an optical axis $L_B$ of a visible light beam emitted from the light source 22.

Figure 4:
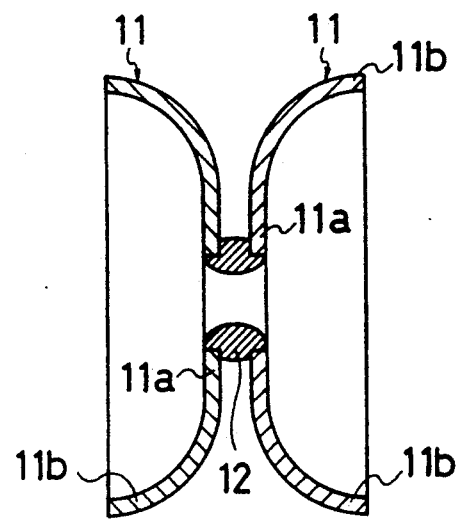
FIG. 4 is a front sectional view showing a cell part composed of half cells, for use as components of the accelerating tube, bonded by means of a connecting member.

Then, the half cells 11 were laser-welded to one another by means of the connecting members 12 at their respective small-diameter portions 11a, as shown in FIG. 4, whereby a plurality of cell parts were manufactured. Each half cell 11 at each end of the superconducting accelerating tube 10 was welded in a manner such that its small-diameter portion 11a was butted to the pipe portion 13a of its corresponding flange 13, whereby a cell part (not shown) with the flange 13 bonded thereto was obtained.

Figure 5:
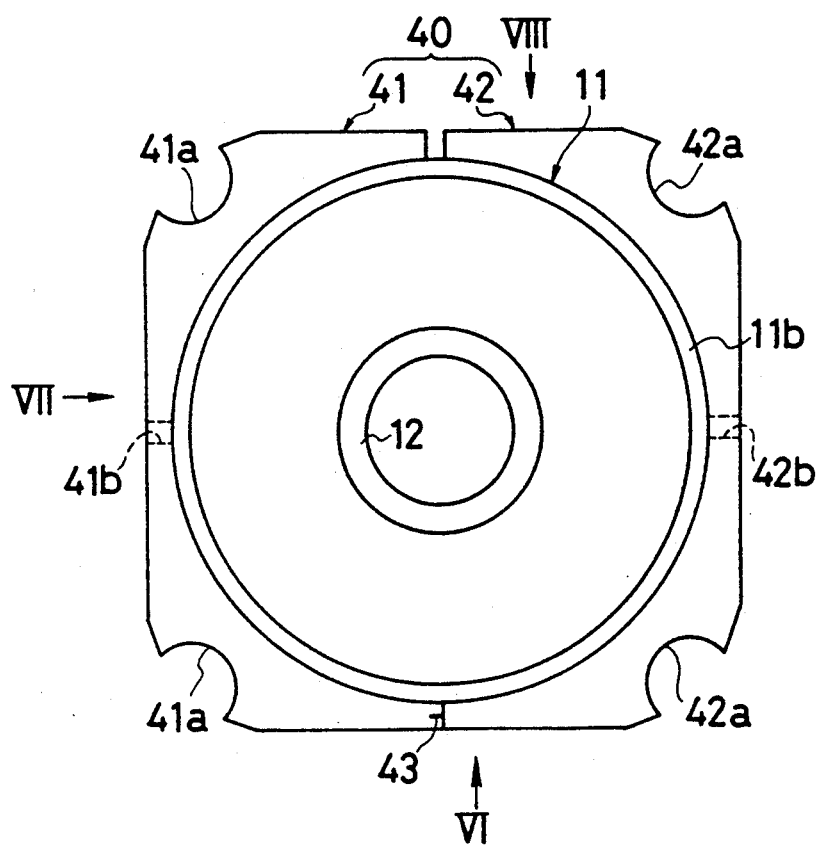
FIG. 5 is a side view showing one of the cell parts of FIG. 4 fixed by jigs.
Figure 6:
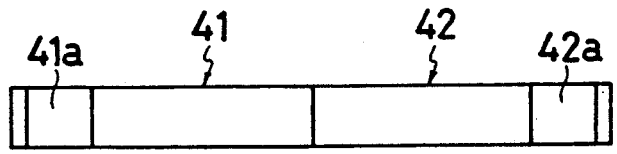
FIG. 6 is a fragmentary view of jigs taken in the direction of arrow VI of FIG. 5.
Figure 7:
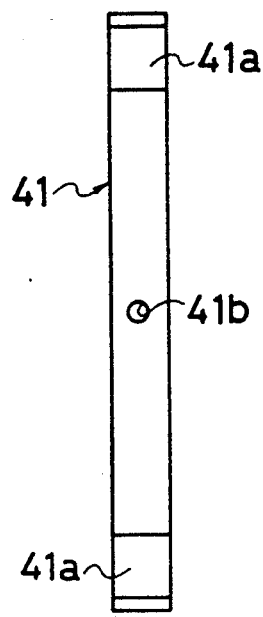
FIG. 7 is a fragmentary view of jigs taken in the direction of arrow VII of FIG. 5.
Figure 8:
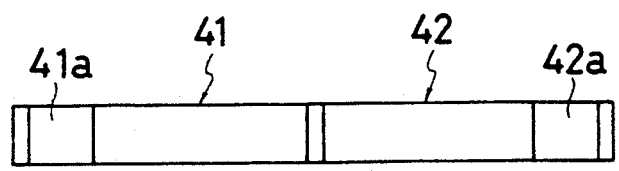
FIG. 8 is a fragmentary view of jigs taken in the direction of arrow VIII of FIG. 5.

Subsequently, the cell parts manufactured in this manner were butted to one another at the respective large-diameter portions 11b of their half cells 11, and the outer peripheries of each two butting large-diameter portion 11b were clamped and fixed to each other by means of ring-shaped jig means 40, as shown in FIG. 5.

The jig 40 is composed of a pair of symmetrical fastening jigs 41 and 42. As shown in FIGS. 5 to 8, the jigs 41 and 42 are formed having two pairs of semicircular notch portions 41a and 42b, respectively, on the outside, and orifices 41b and 42b, respectively, which penetrate the jigs from the outside to the inside. As shown in FIG. 5, the jigs 41 and 42 are connected at one end to each other be means of a pin 43.

Figure 9:
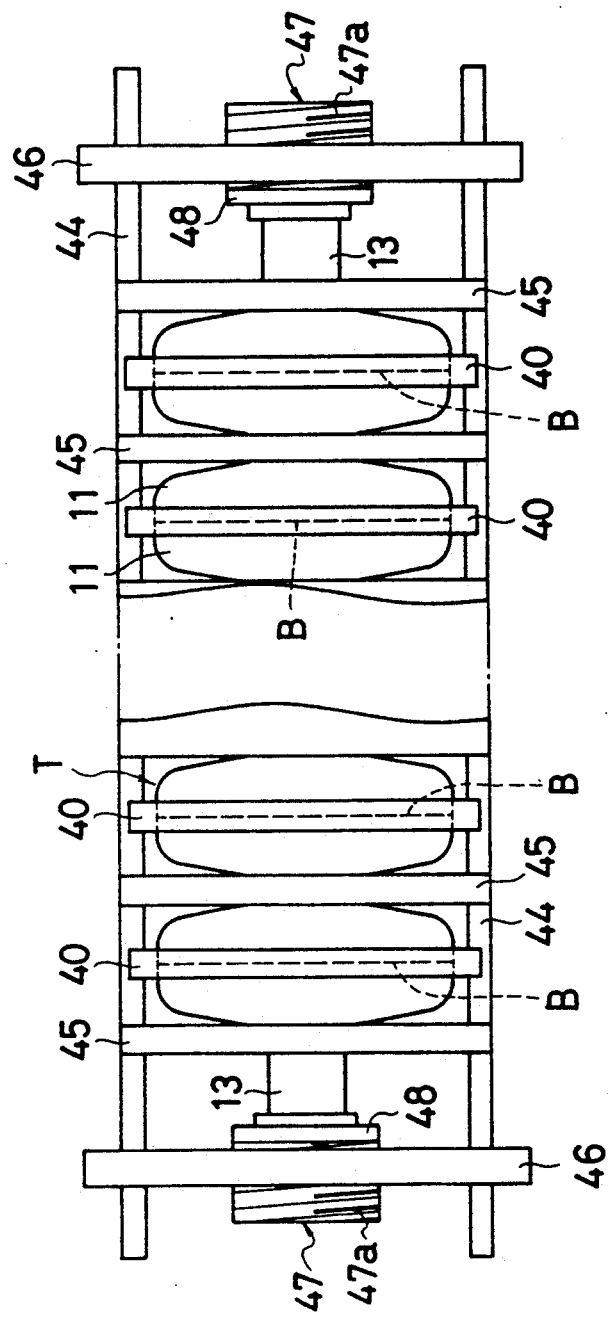
FIG. 9 is a front view showing a tubular body composed of a plurality of cell parts fastened together into an integral body by means of fastening bands.

As shown in FIG. 9, two sets of paired cell parts were fixed at the butting portions B by the jig 40, and connected into a tubular structure. Thereafter, four connecting pipes 44 were attached individually to the respective notch portions 41a and 42a of the fastening jigs 41 and 42, and were fastened together into an integral body by means of fastening bands 45. Thus, a tubular body T was obtained.

Thereafter, circular flanges 46, each having a taped hole in the center, were fixed individually to the respective opposite ends of the four connecting pipes 44. Then, cylindrical pressure members 47, each having a thread portion 47a thereon mating with the tapped hole of each corresponding flange 46, were screwed into their corresponding tapped holes, whereby the tubular body T was clamped from both end sides.

The clamping force on the tubular body T was controlled by adjusting the screwing depth of the pressure members 47 in the tapped holes of the circular flanges 46. Each pressure member 47 was fitted with a back plate 48 of Nb having an opening (not shown) at that end portions thereof which engages its corresponding flange 13. Thus, the superconductivity of the superconducting accelerating tube 10 manufactured by the laser welding was prevented from being damaged.

Figure 1:
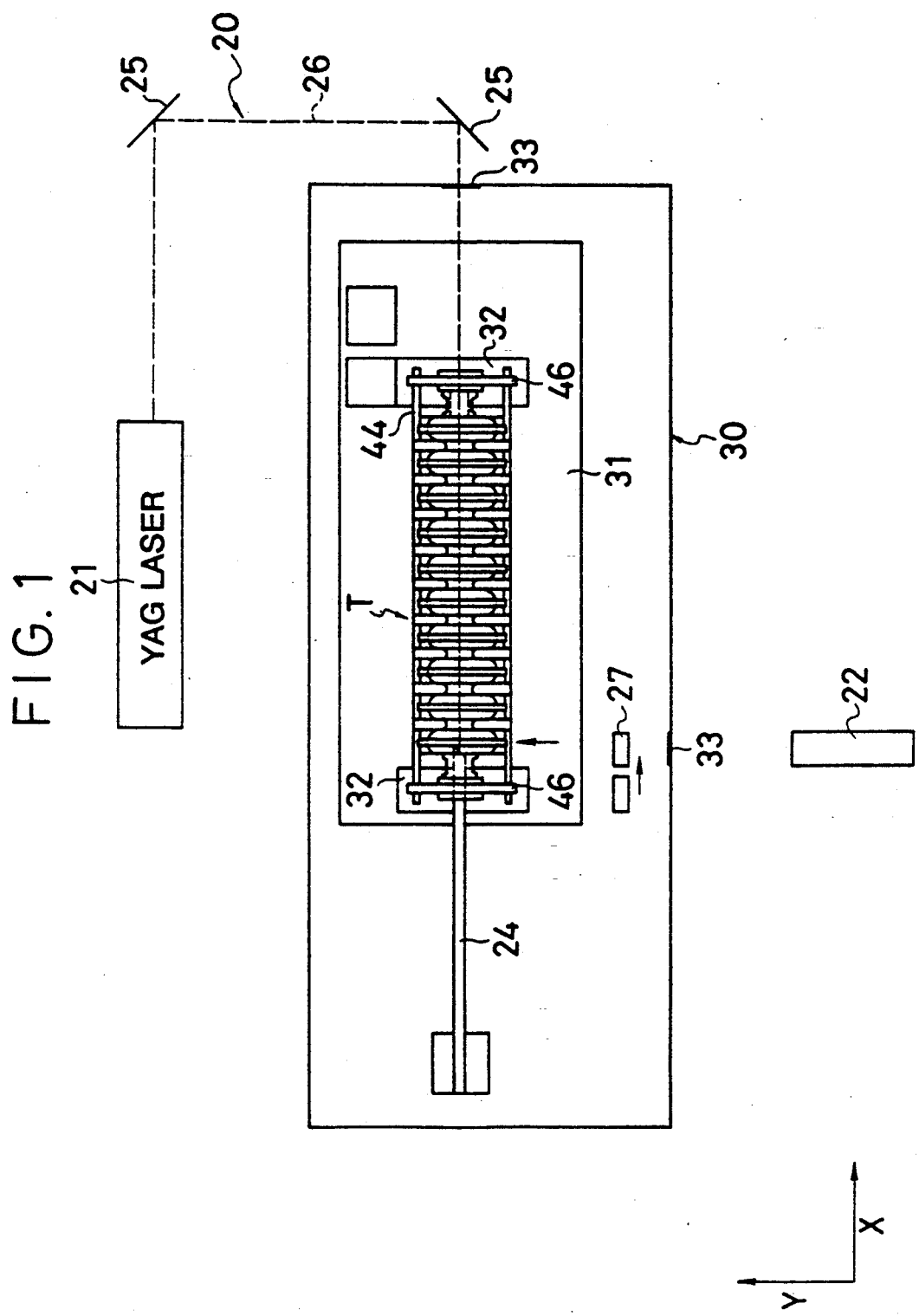
FIG. 1 is a plan view illustrating a superconducting accelerating tube and a manufacturing method therefor according to a first embodiment of the present invention, in which the accelerating tube is arranged together with an optical system and a chamber for welding the accelerating tube.

Then, as shown in FIG. 1, the tubular body T was set in the chamber 30, the circular flanges 46 were mounted on their corresponding rotating devices 32, and the moving table 31 was positioned in the following manner.

First, the table 31 was moved in the direction of arrow X of FIG. 1 so that the orifices 41b and 42b the fastening jigs 41 and 42 were situated on the optical axis of $L_B$ of the laser beam emitted from the probe light source 22.

Thereafter, moving table 31 was moved in the direction of arrow Y so that the butting portions were situated on the focus of the condenser mirror 23.

In the present embodiment, the outside diameter of each half cell 11 was 9 cm, and the focal length of the condenser mirror 23 was 4.5 cm. If the mirror 23 is disposed in the central position of the half cell 11, therefore, the YAG laser beam, which is emitted from the YAG laser generator 21 and condensed by means of the mirror 23, converges onto the butting portion or, which is the inner surface of the large-diameter portion 11b of the half cell 11.

After the moving table 31 was positioned in this manner, the inert gas was introduced through the pipe 24 into the chamber 30 to fill the same, as shown in FIG. 1. Then, the whole tubular body T was rotated by rotating the circular flanges 46 by means of their corresponding rotating devices 32, and the respective inner surfaces of the butting portions were welded. In doing this, a beam absorber 27 was moved in the direction of the arrow of FIG. 1 to b located on the optical path lest the chamber 30 be destroyed by the leaked YAG laser beam for working.

After the butting portions were welded throughout the circumference in this manner, the moving table 31 was moved for one pitch (=3.5 cm) of the butting portion in the direction of arrow X, and the respective butting portions of the next two adjacent half cells 11 were welded together. Thereafter, the same operation was repeated, whereupon the superconducting accelerating tube 10 was obtained in which the half cells 11, the connecting members 12, and the flanges 13 were laser-welded together at the butting portions B, as shown in FIG. 2.

The welding conditions used in the present embodiment include the YAG laser beam wavelength of 1.06 μm, average output of 200 W, pulse width of 10 msec, repetition frequency of 10 Hz, and peak power of 2.0 kW.

Various measurements were made on the superconducting accelerating tube 10 manufactured in this manner. Since the YAG laser beam was applied only to the respective surfaces of the butting portions of the components, only the butting portions were laser-welded, and the depth of welding at the butting portions was 200 μm after inside polishing (50 μm).

The dimensional accuracy of the accelerating tube, in terms of the lengths per unit cell before and after the welding, obtained using the laser welding of the present embodiment was 10 μm or less, compared with 100 μm for the case of the conventional electron beam welding.

The accelerating tube 10 manufactured according to the present embodiment may be used in a manner such that it is fixed by the jig 40 even after the welding. By doing this, the mechanical strength of the accelerating tube 10 can be further improved.

EXAMPLE 2

Figure 10:
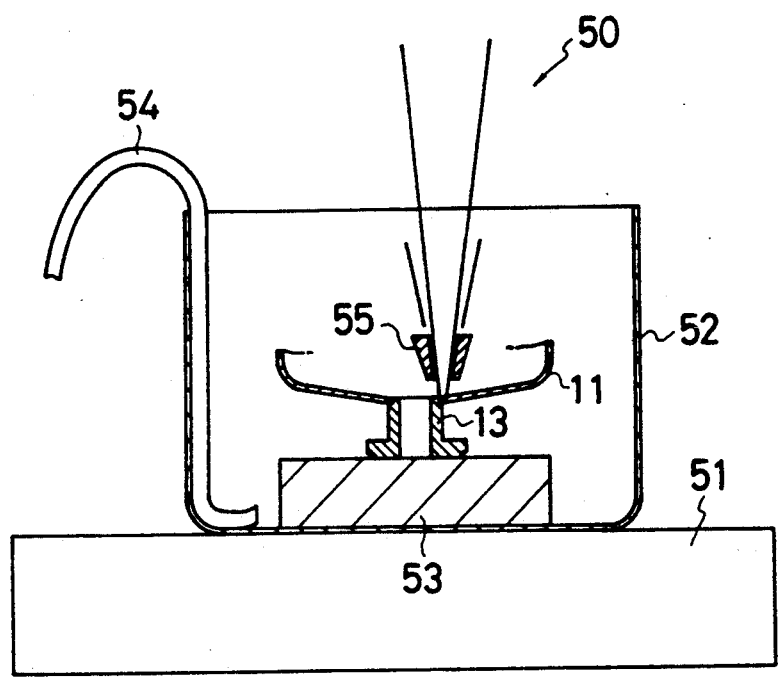
FIG. 10 is a front view, partially in section, illustrating a superconducting accelerating tube and a manufacturing method therefor according to a second embodiment of the present invention, and showing a welding apparatus used to weld components of a single-cell accelerating tube together, thereby manufacturing a cell part.
Figure 11:
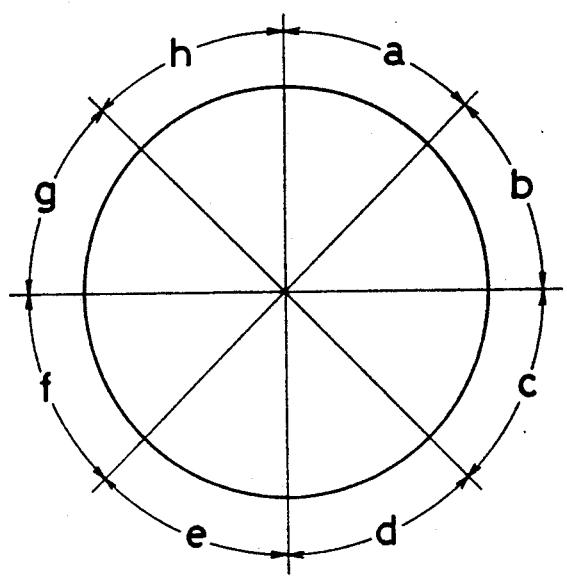
FIG. 11 is a diagram showing divisional welding regions for cell apart welding.
Figure 12:
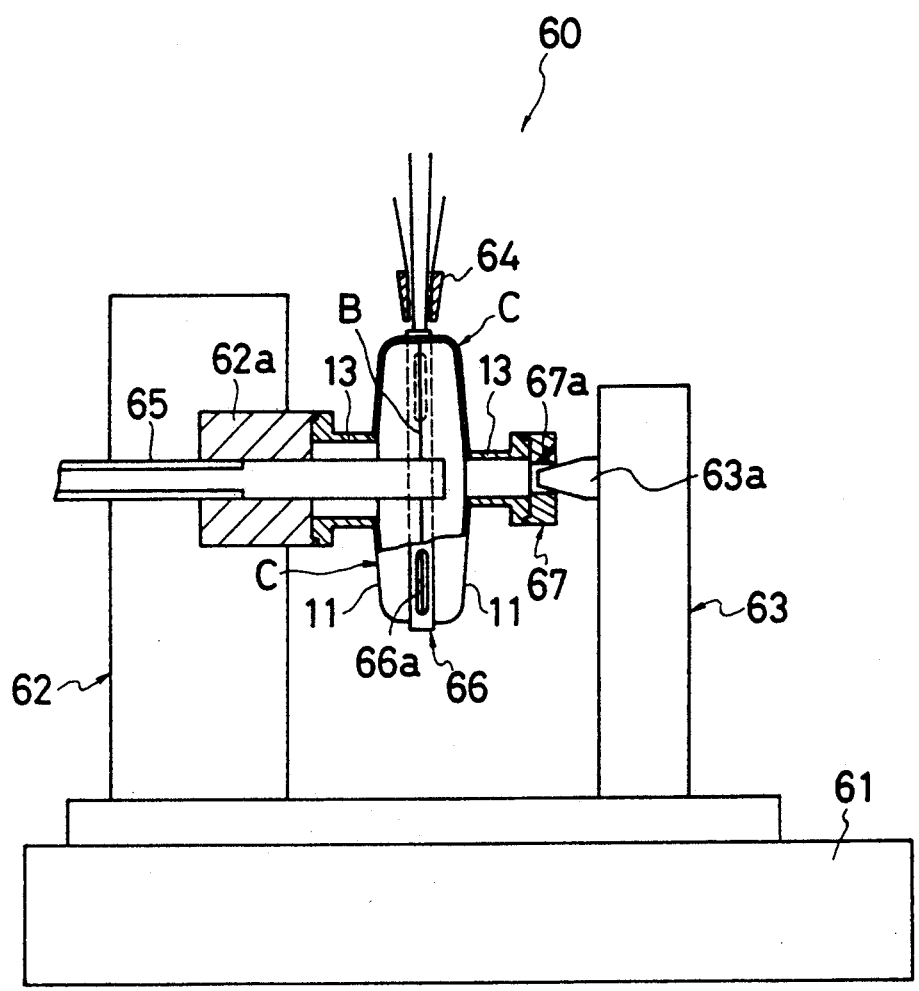
FIG. 12 is a front view, partially in section, showing a welding apparatus used to weld together the cell parts manufactured by means of the welding apparatus of FIG. 10.

Referring now to FIGS. 10 to 12, a second embodiment of the present invention will be described. According to the present embodiment, a single-cell accelerating tube with the resonance frequency of 2,856 MHz, cell length of 3.5 cm, and cell thickness of 0.5 mm was manufactured as a superconducting accelerating tube by generating a YAG laser beam in pulses.

In the description of the embodiments to follow, like reference numerals are used to designate the same members as those of the first embodiment throughout the drawings.

In the present embodiment, the YAG laser beam was applied to the respective surfaces of the components for welding by using a welding apparatus 50 shown in FIG. 10.

The welding apparatus 50 is mounted on a moving table 51. A work board 53, which carries the components to be welded, is disposed at the bottom of an open-topped vessel 52. Further, a supply pipe 54 for supplying an inert gas is arranged in the vessel 52, and a blow-off nozzle 55 is located over the board 53 and substantially in the middle of the vessel 52 with respect to the depth direction thereof.

The moving table 51 is movable in the directions of three axes, that is, in the horizontal direction (longitudinal and crosswise) and the vertical direction. The table 51 serves to move the components set on the work board 53 in the directions of the three axes so that the YAG laser beam is applied to the respective butting surfaces of the components butted to each other.

The work board 53 is made of a material with high thermal conductivity, such as copper, in order to accelerate temperature reduction attributable to the radiation of heat from the welded components. In FIG. 10, the half cell 11 and the flange 13 ar arranged so that the small-diameter portion 11a, as a peripheral end portion, and the end of the pipe portion 13a are butted to each other. In welding the half cell 11 and the connecting member 12 together, however, specific jig (not shown), corresponding in shape to those members, is arranged on the work board 53.

The supply pipe 54 is used to blow off an inert gas, e.g., argon gas, toward the work board 53 in the vessel 52, thereby filling the vessel with the gas (downward displacement). The gas is continuously supplied at a flow rate of 20 l/min or more until the temperatures of the components during and after the welding operation become low enough.

The blow-off nozzle 55 blows off the inert gas, such as argon gas, against the weld portion when the components 11 and 13, butted to each other, are welded by means of the YAG laser beam applied thereto.

In the present embodiment, the small-diameter portion 11a and the pipe portion 13a were first butted to each other on the work board 53 in the vessel 52, the half cell 11 and the flange 13 are set in the manner shown in FIG. 10, and the argon gas was introduced through the supply pipe 54 into the vessel 52.

Then, the moving table 51 was suitably moved, the YAG laser beam was applied to the respective inner surfaces of the half cell 11 and the flange 13 butted to each other, and the argon gas was blown off from the blow-off nozzle 55, whereby the components were tacked at four spots by spot welding. The pulse width of the YAG laser beam applied for the spot welding was adjusted to 70% of that of a laser beam used in welding the butting portions throughout the circumference, which will be described below.

Subsequently, the moving table 51 was moved in the directions of the three axes so that the applied laser beam generated a circle along the weld portion, whereby the butting portions were welded throughout the circumference of the weld portion by means of the YAG laser beam with its peak power.

The welding was effected at a time when the diameter of the small-diameter portion 11a of the half cell 11 was as short as 18 mm (circumferential length: about 57 mm), that is, when the circumferential length of the weld portion was relatively short so that a temperature rise of the whole welded structure, caused by heat produced by the laser beam irradiation and applied to the butting portions, was small. On the other hand, when the diameter of the small-diameter portion 11a was as long as 38 mm (circumferential length: about 120 mm), that is, when the circumferential length of the weld portion was relatively long so that the temperature rise of the whole welded structure caused by the applied heat was great, the weld portion to be welded was divided into a plurality of regions, in consideration of the influence of the temperature rise in the welded components, including the half cell 11, connecting member 12, flange 13, etc.

As shown in FIG. 11, the divisional regions of the weld portion include eight regions a to h which are arranged along the butting portions of the half cell 11 and the flange 13.

After the region a was welded, a cooling time of 2 minutes was secured so that he temperature of the whole structure was lowered. Then, after the region e, which is situated on the opposite side of the center to the region a, was welded, the remaining regions were successively welded in the order of c, g, b, f, h and d, with the same cooling time between each two successive welding cycles, Thus, all the regions arranged around the butting portions were welded.

Subsequently, two cell parts C, each composed of the half cell 11 and the flange 13 thus welded together, were joined so that the large-diameter portions 11b of their respective half cells 11 were butted to each other, and the butting portions were welded together.

A welding apparatus 60 shown in FIG. 12 is used for the welding described above. In the welding apparatus 60, rotating means 62 and 63 are arranged on a base plate 61 so as to face each other with a fixed space between them. A flow-off nozzle 64 is disposed between the rotating means 62 and 63.

At least one of the rotating means 62 and 63 is movable toward and away from the other one on the base plate 61. The rotating means 62 and 63 include rotating members 62a and 63a, respectively, which are rotated by means of drive means, such as motors. Aluminum is used as the material for the rotating member 62a, in consideration of a rapid fall of the temperature of each cell part C, formed of the half cell 11 and the flange 13 welded together, due to its dissipation of heat. A supply pipe 65 is inserted in the center of the rotating member 62a. The pipe 65 is adapted to be passed through the cell parts C when the cell parts C are to be welded at their butting portions B, so that the inert gas, such as argon gas, is supplied through the pipe 65 at the flow rate of 20 l/min or more.

Prior to the welding operation, the cell parts C were assembled together in a manner such that the respective large-diameter portions 11b of their half cells 11 were butted to each other, and a fastening band 66 was fitted on the butting portions B so that the deviation between the butting large-diameter portions 11b was small, as shown in FIG. 12.

The fastening band 66 has three circumferential slots 66a of 5-mm width and 4-cm length.

Thereafter, jig 67, which, like the rotating member 62a, is made of aluminum in consideration of the effect of heat dissipation, was disposed between the flange 13 of the one cell part C and the rotating member 63a, as shown in FIG. 12. Then, the cell parts C, butted to each other, were arranged between the rotating means 62 and 63, and the argon gas was introduced through the supply pipe 65 into the butting cell parts C.

In order to prevent the internal pressure from increasing with the argon gas supply, the jig 67 is provided with a vent hole 67a as illustrated.

Then, the YAG laser beam was applied from outside the butting portions B of the cell parts C butted to each other, while the argon gas was being blown off from the blow-off nozzle 64, whereby the butting portions B were tacked by spot welding at three spots corresponding individually to the slots 66a of the fastening band 66. The intensity of the YAG laser beam used for this spot welding was adjusted to ⅓ to ½ of the peak power, and the pulse width to 30% to 80% of that of the laser beam for the through-the-circumference welding.

Subsequently, the fastening band 6 was removed from the cell parts C, and the butting portions B were welded throughout the circumference by means of the YAG laser beam with its peak power. In this case, the circumference of each butting portion B was divided into 16 regions, and the butting portions B were welded with a cooling time of one minute between each two successive cycles, in the same manner as aforesaid, lest the temperature of the whole components exceed 100° C.

In the embodiment described above, the butting portions B, each divided into a plurality of regions, were pulse-welded in argon gas atmosphere with cooling times. Therefore, the welded butting portions B of a single-cell accelerating tube obtained were able to be rapidly cooled, so that they hardly suffered any welding-induced thermal strain. Further, the electrical properties of the butting portions B were higher than in the case of the electron beam welding in the vacuum of $10^{-6}$ torr.

It used to take 10 to 15 hours to manufacture a single-cell accelerating tube with the same construction as that of the present embodiment by the conventional electron beam welding. According to the present embodiment, in contrast with this, the accelerating tube was able to be completed in 40 to 60 minutes because there was no need of evacuating the atmosphere. Thus, the manufacturing time for the superconducting accelerating tube was able to be reduced by a large margin.

EXAMPLE 3

Figure 13:
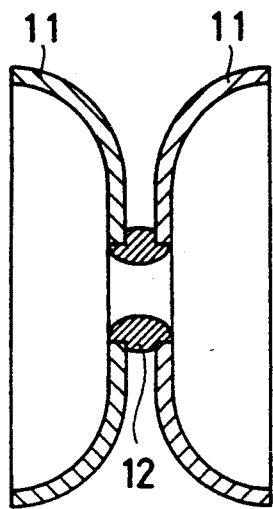
FIG. 13 is a front sectional view for illustrating a third embodiment of the present invention, in which a cell part is composed of half cells welded together with the aid of a connecting member.
Figure 14:
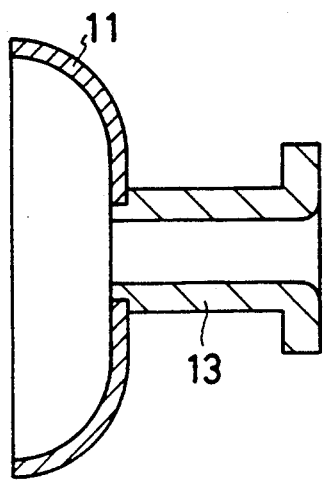
FIG. 14 is a front sectional view of a cell part composed of a half cell and a flange welded together.
Figure 15:
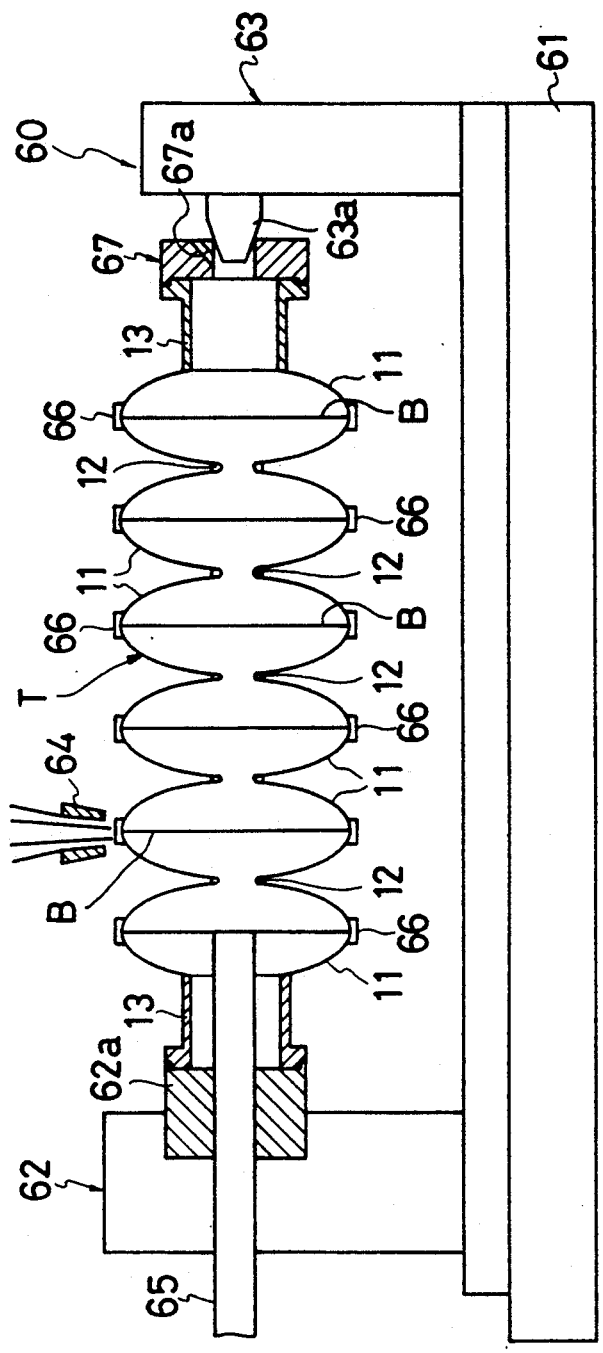
FIG. 15 is a front view, partially in section, showing a state in which the cell parts shown in FIGS. 13 and 14 are assembled and mounted on the welding apparatus.

Referring now to FIGS. 13 to 15, a third embodiment of the present invention will be described. According to the present embodiment, a ⅔-$\pi$ mode multi-cell accelerating tube with the resonance frequency of 2,856 MHz was manufactured as a superconducting accelerating tube by generating a YAG laser beam in pulses.

First, a plurality of cell parts were manufactured by welding the half cells 11 and their corresponding flanges 13 or by welding the half cells 11 to one another at their respective peripheral end portions by means of the connecting members 12, as shown in FIGS. 13 and 14, in the same manner as in Example 1.

Then, as shown in FIG. 15, these cell parts were butted to one another, and the respective outer peripheries of the butting portions B were fastened to form an integral tubular body T by means of the fastening bands 66, and the tubular body T was mounted between the rotating means 62 and 63 of the welding apparatus 60.

Subsequently, the butting portions B were spot-welded at the portions corresponding individually to the slots 66a of the fastening band 66 so that the individual cell parts were tacked to one another, in the same manner as in Example 2.

Thereafter, the fastening bands 66 were removed, and argon gas was introduced through the supply pipe 65 into the tubular body T.

The YAG laser beam was applied to the butting portions B from the outside while integrally rotating the tubular body T by means of the rotating means 62 and 63, whereby the butting portions B were welded throughout the circumference by means of the YAG laser beam with its peak power. In doing this, as in the case of Example 2, the circumference of each butting portion B was divided into a plurality of regions, and the butting portions B were welded with predetermined cooling times lest the temperature of the while components be excessively high.

The YAG laser beam was converged by means of a condenser lens with a focal length f=120 mm, and the following laser-beam welding conditions were used.

| LASER BEAM WELDING CONDITIONS | | |
| --- | --- | --- |
| | HALF CELL TO FLANGE | CELL TO CELL |
| PARALLEL BEAM DIAMETER (mm) | 30 | 30 |
| PEAK POWER (KW) | 3.25 (1.25)*1 | 3.08 (1.25) |
| PULSE WIDTH (msec.) | 10 | 10 |
| FREQUENCY (Hz) | 12 | 12 |
| MOVING SPEED (mm/min)*2 | 180 | 180 |
| NOZZLE DIAMETER (mm) | 6 | 6 |
| FLOW RATE OF ARGON GAS (l/min) | 30 | 40 |
| DISTANCE BETWEEN THE NOZZLE AND THE FACE OF EACH BUTTING PORTION B (mm) | 5 | 3 |

*1: The parenthesized figure represents the intensity of the laser beam for spot welding.
*2: The moving speed (mm/min) is the speed of movement of the laser beam along the surface of the butting portions.

in the multi-cell accelerating tube manufactured in this manner, the butting portions B, each divided into a plurality of regions, were welded in argon gas atmosphere with the cooling times. Therefore, the welded butting portions B were free from excessive heat, and were able to be rapidly cooled. Thus, the resulting multi-cell accelerating tube hardly suffered any welding-induced thermal strain, and the electrical properties of the respective inner surfaces of the butting portions B were improved in comparison with an application of the electron beam welding.

Further, the multi-cell accelerating tube of the present embodiment was able to be manufactured in a time one-tenth as short as that required for the electron beam welding.

EXAMPLE 4

Figure 16:
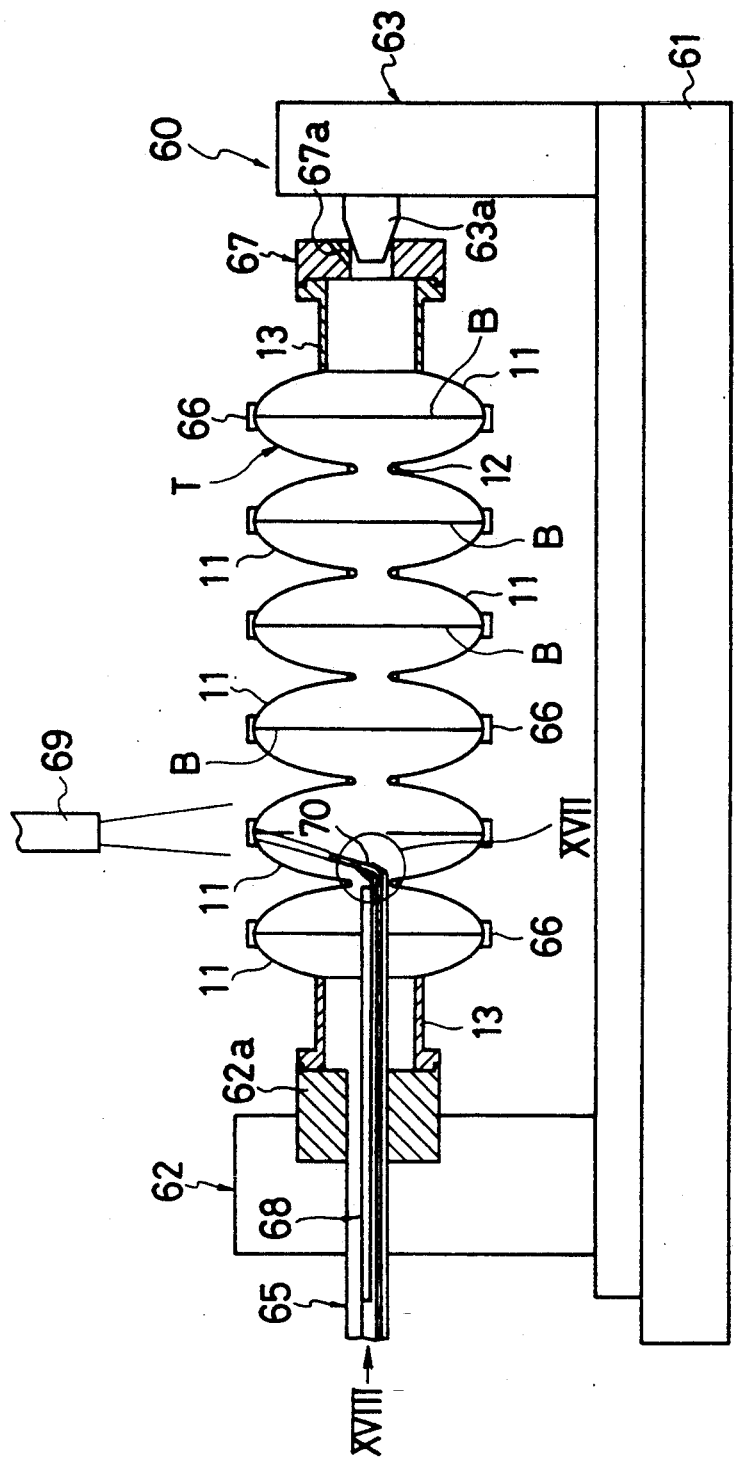
FIG. 16 is a front view, partially in section, for illustrating a fourth embodiment of the present invention, in which a plurality of cell parts are welded by means of an optical fiber in the welding apparatus shown in FIG. 15.
Figure 17:
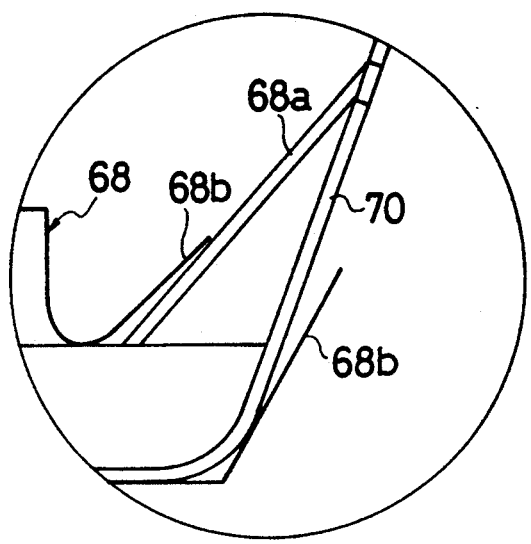
FIG. 17 is an enlarged view of a portion XVII in FIG. 16.
Figure 18:
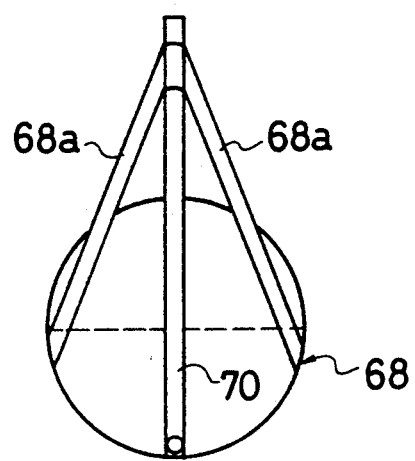
FIG. 18 is an enlarged fragmentary view taken in the direction of arrow XVIII of FIG. 16.

Referring now to FIGS. 16 to 18, a multi-cell accelerating tube and a manufacturing method therefor according a fourth embodiment of the present invention will be described.

First, a plurality of cell parts were manufactured by welding the half cells 11 and their corresponding flanges 13 or by welding the half cells 11 to one another at their respective peripheral end portions by means of the connecting members 12, in the same manner as in Example 3.

Then, as shown in FIG. 16, these cell parts were butted to one another, and the fastening bands 66 were fitted on the respective outer peripheries of the butting portions B to form a tubular body T, which was mounted between the rotating means 62 and 63 of the welding apparatus 60.

Subsequently, the tubular body T was supplied with argon gas from jig 68, which is passed through the supply pipe 65, and a YAG laser beam was guided into the tubular body T by means of an optical fiber 70.

Thus, the laser beam was applied from inside the tubular body T so that the butting portions B were tacked at a plurality of spots by spot welding, and the fastening bands 66 were then removed. The circumference of each butting portion B was divided into a plurality of regions, as in Example 3, and the butting portions B were welded throughout the circumference by means of the laser beam with its peak power of 7 kW, with a cooling time of one minute between each two successive cycles.

As shown in FIGS. 17 and 18, the jig 68 is a pipe-shaped member which guides the optical fiber 70 to the butting portions B while supporting the fiber by means of its supporting members 68a. Attached to the jib 68 are control plates 68b which force the argon gas, supplied through the jig 68, to be blown against the butting portions B. The butting portions B are compulsorily cooled by means of argon gas blown off from an external blow-off nozzle 69, as well as the argon gas driven from the jig 68 in the supply pipe 65.

Thus, according to the present embodiment, the use of the optical fiber 70 permits use of a smaller optical system than in the case where the laser beam is applied to the butting portions B after it is condensed by means of the condensing lens or mirror, and an accelerating tube of a smaller size can be manufactured. Since the butting portions B is welded from inside the tubular tube T, moreover, the butting portions B can be beautifully finished without entailing undulating beads on the inner surface, and the dimensional accuracy is enhanced. The electrical properties of the resulting accelerating tube was improved in comparison with an application of the electron beam welding.

EXAMPLE 5

Figure 19:
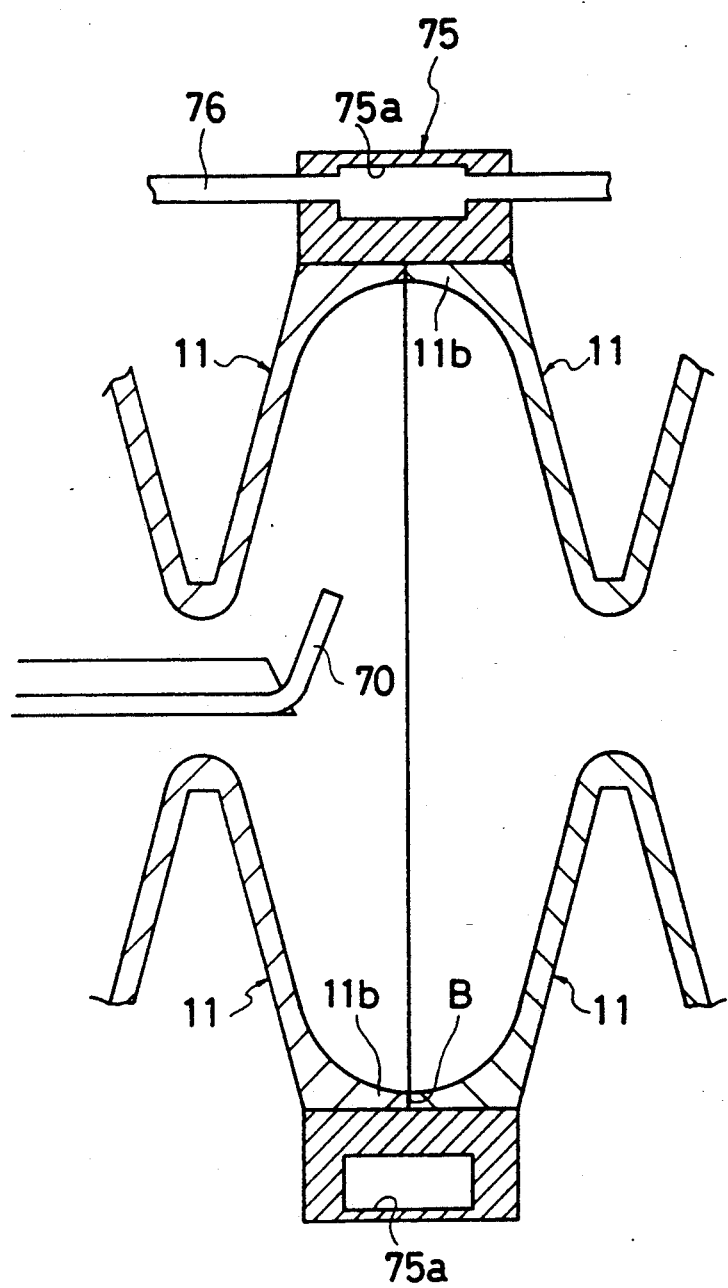
FIG. 19 is a front view, partially in section, for illustrating a fifth embodiment of the present invention, in which half cells butted to each other are welded by means of a laser beam applied thereto from an optical fiber.

FIG. 19 illustrates a fifth embodiment of the present invention relating to a multi-cell accelerating tube which does not use the connecting members 12 and a manufacturing method therefor. In the present embodiment, as in the fourth embodiment, a plurality of cell parts butted to one another are welded together by mean of an optical fiber.

As shown in FIG. 19, a pair of half cells 11, which constitute a cell part, are assembled into the shape of an accelerating tube, in a manner such that a fastening band 75 is fitted no butting portions B at which large-diameter portions 11b at the respective peripheral end portions of the half cells 11 are butted to each other. In this state, the half cells 11 were tacked by spot welding such that a YAG laser beam of 7-kW peak power was applied to a plurality of spots from inside the butting portions B by means of the optical fiber 70.

Thereafter, the YAG laser beam was applied again, with its peak power of 7 kW, to the butting portions B from inside the same throughout the circumference thereof, whereby the half cells 11 were welded together to form the multi-cell accelerating tube.

Each fastening band 75, fastening the cell parts in the shape of the accelerating tube, has a passage 75a therein, through which cooling water flows, thereby compulsorily cooling the outside of the butting portions B to be welded. The cooling water is supplied through a water supply pipe 76 which connects with the passage 75a.

In the present embodiment, the butting portions B to be welded are compulsorily cooled in this manner, so that the weld length coverable by each welding cycle can be increased, and the cooling time can be shortened. Thus, the accelerating tube can be manufactured at higher speed.

Also, the cell parts butted to one another can be welded from outside. In this case, it is necessary only that the cell parts be spot-welded in a manner such that the outer peripheries of the butting portions are fastened by means of the fastening bands 66 to assemble the cell parts, by the method described in connection with Examples 2 and 3, and the butting portions be then welded throughout the circumference by means of the laser beam after the bands 66 are removed.

EXAMPLE 6

Figure 20:
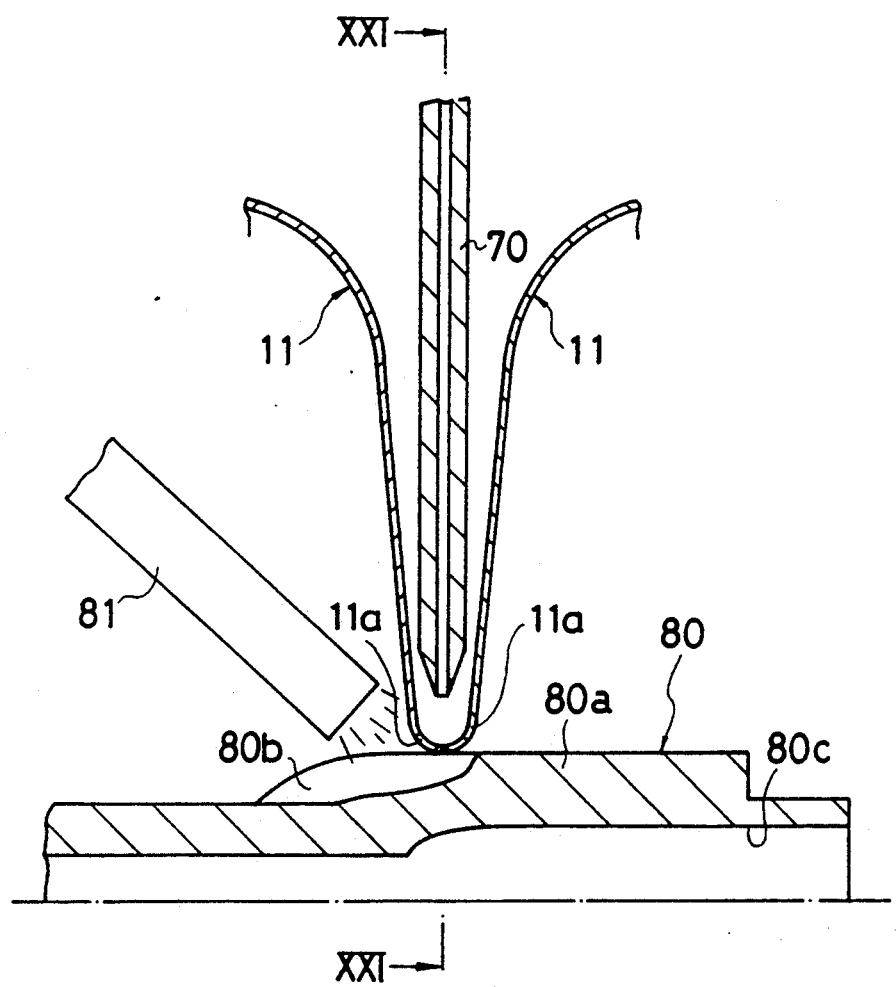
FIG. 20 is a front view, half in section, for illustrating a sixth embodiment of the present invention, in which half cells are welded by means of a laser beam applied thereto from an optical fiber after being positioned by means of a positioning jig through which cooling water is circulated.
Figure 21:
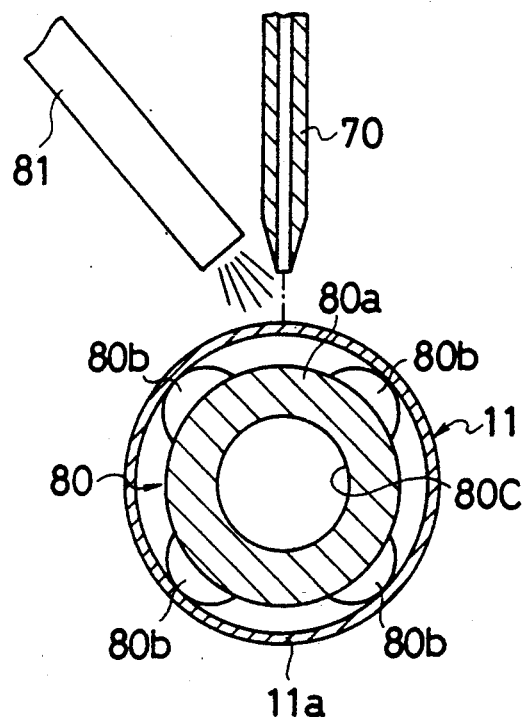
FIG. 21 is a sectional view taken along line XXI—XXI of FIG. 20.

Referring now to FIGS. 20 and 21, a sixth embodiment of the present invention will be described.

According to the present embodiment, the half cells 11 are directly welded without using the connecting member 12. In welding these half cells 11, it is hard to position their small-diameter portions 11a with respect to each other, so that a positioning jig 80 is used for the welding.

The positioning jig 80 is an aluminum member, which includes a cylindrical base 80a and four projections 80b protruding radially outward from the base 80a in opposite directions, as shown in FIG. 21. Formed in the center of the jig 80 is a passage 80c through which cooling water flows. The passage 80c is connected with a supply pipe (not shown) through which the cooling water is supplied by means of a joint, such as a quick joint.

Prior to the welding operation, the positioning jig 80 was fitted in each small-diameter portion 11a, and the half cells 11 were supported and positioned by means of the four projections 80b lest there be no deviation between the small-diameter portions 11a butted to each other.

Then, a blow-off nozzle 81, disposed nearby, was used to blow argon gas against the butting small-diameter portions 11a whole causing the cooling water to flow through the passage 80c. While doing this, the half cells 11, positioned in the aforesaid manner, were tacked to each other by spot welding such that a YAG laser beam of 7-kW peak power was applied to the butting portions, without shooting those spots which correspond to the four projections 80b of the positioning jig 80.

Subsequently, the positioning jig 80 was removed, and the tacked half cells 11 were welded throughout the circumference by means of the YAG laser beam applied thereto from outside the small-diameter portions 11a, with the argon gas being blow off from the blow-off nozzle 81, by the method described in connection with Example 3.

Then, a plurality of cell parts obtained by this welding operation were butted to one another at the respective peripheral end portions or large-diameter portions 11b the half cells 11, and the respective surfaces of the butting portions 11b were welded from outside, in the same manner as in Example 3, thereby producing a multi-cell accelerating tube.

When the weld portion of the accelerating tube thus obtained was examined, it was found that the small-diameter portions 11a, welded only on the outer surface side, had been beautifully finished without entailing undulating weld beads on the inner surface side or welding-induced strain.

In general, a carbon dioxide gas laser and a YAG laser are mainly used as high-output lasers. In the embodiment described above, the YAG laser was used to provide the laser beam because of its higher energy absorption capacity for Nb and higher operating efficiency.

On the contrary, the carbon dioxide gas laser, whose absorption capacity for Nb is relatively low, when the output thereof is reduced, its absorption capacity lowers to an extreme degree such that is difficult to obtain suitable conditions for the spot welding. Since the absorption capacity drastically increases with a temperature rise, moreover, the temperature of the weld portion becomes too high to obtain a desired welded surface.

The carbon dioxide laser may, however, be used in the method of the present invention if the depth of welding and the temperature of the butting portions are adjusted by shortening the pulse width and controlling the pulse waveform.

What is claimed is:

1. A superconducting accelerating tube comprising:
comprising a plurality of components, formed of a superconducting material and individually having peripheral end butting portions which are adapted to be butted to one another, said components being butted to one another at the peripheral end butting portions;
said superconducting material being niobium; and
wherein the peripheral end butting portions which are butted to one another are welded together by means of a laser beam, and wherein at least only the respective inner surfaces of said butting portions are welded by means of aid laser beam.

2. A superconducting accelerating tube according to claim 1, wherein the depth of welding is not greater than half the thickness of the superconducting material and not smaller than 150 $\mu$m.

3. A superconducting accelerating tube according to claim 2, wherein said plurality of components have a thickness ranging from 0.1 mm to 1 mm.

4. A method for manufacturing a superconducting accelerating tube, wherein the superconducting accelerating tube comprises a plurality of components, formed of a superconducting material and individually having peripheral end butting portions which are adapted to be butted to one another,
the method comprising:
making said components of niobium superconducting material;
butting said components to one another at the peripheral end butting portions thereof; and
welding together said peripheral end butting portions which are butted to one another together by means of a laser beam; and
wherein said laser beam is applied to said peripheral end butting portions so that at least only the respective inner surfaces of said peripheral end butting portions of said components are laser-welded to one another.

5. A method for manufacturing a superconducting accelerating tube according to claim 4, wherein the depth of welding is not greater than half the thickness of the superconducting material and not smaller than 150 μm.

6. A method for manufacturing a superconducting accelerating tube according to claim 5, wherein said superconducting material has a thickness ranging from 0.1 mm to 1 mm.

7. A method for manufacturing a superconducting accelerating tube according to claim 4, wherein said laser-welding is performed in an inert gas atmosphere.

8. A method for manufacturing a superconducting accelerating tube according to claim 4, wherein said laser-welding is performed in a vacuum.

9. A method for manufacturing a superconducting accelerating tube according to claim 4, wherein the respective butting portions of said components, butted to one another, are entirely welded after a plurality of spots of the butting portions are tacked to one another by spot welding.

10. A method for manufacturing a superconducting accelerating tube according to claim 4 wherein an outside portion of said butting portions is fixed by using jigs when the butting portions are welded together.

11. A method for manufacturing a superconducting accelerating tube according to claim 9, wherein the intensity of the laser beam used for the spot welding is from ⅓ to ½ of the peak power.

12. A method for manufacturing a superconducting accelerating tube according to claim 9, wherein the pulse width of aid laser beam for the spot welding from 30% to 80% of a pulse width as an irradiation condition used in welding the whole butting portions.

13. A method for manufacturing a superconducting accelerating tube according to claim 9, wherein the region to be welded is divided into at least two sections before welding the whole butting portions, and a predetermined cooling time is interposed between each two successive welding cycles for the sections.

14. A method for manufacturing a superconducting accelerating tube according to claim 4 wherein said laser beam is a YAG laser beam.

15. A method for manufacturing a superconducting accelerating tube according to claim 4 wherein said laser beam is generated in pulses.

* * * * *